United States Patent Office 3,338,096
Patented Aug. 29, 1967

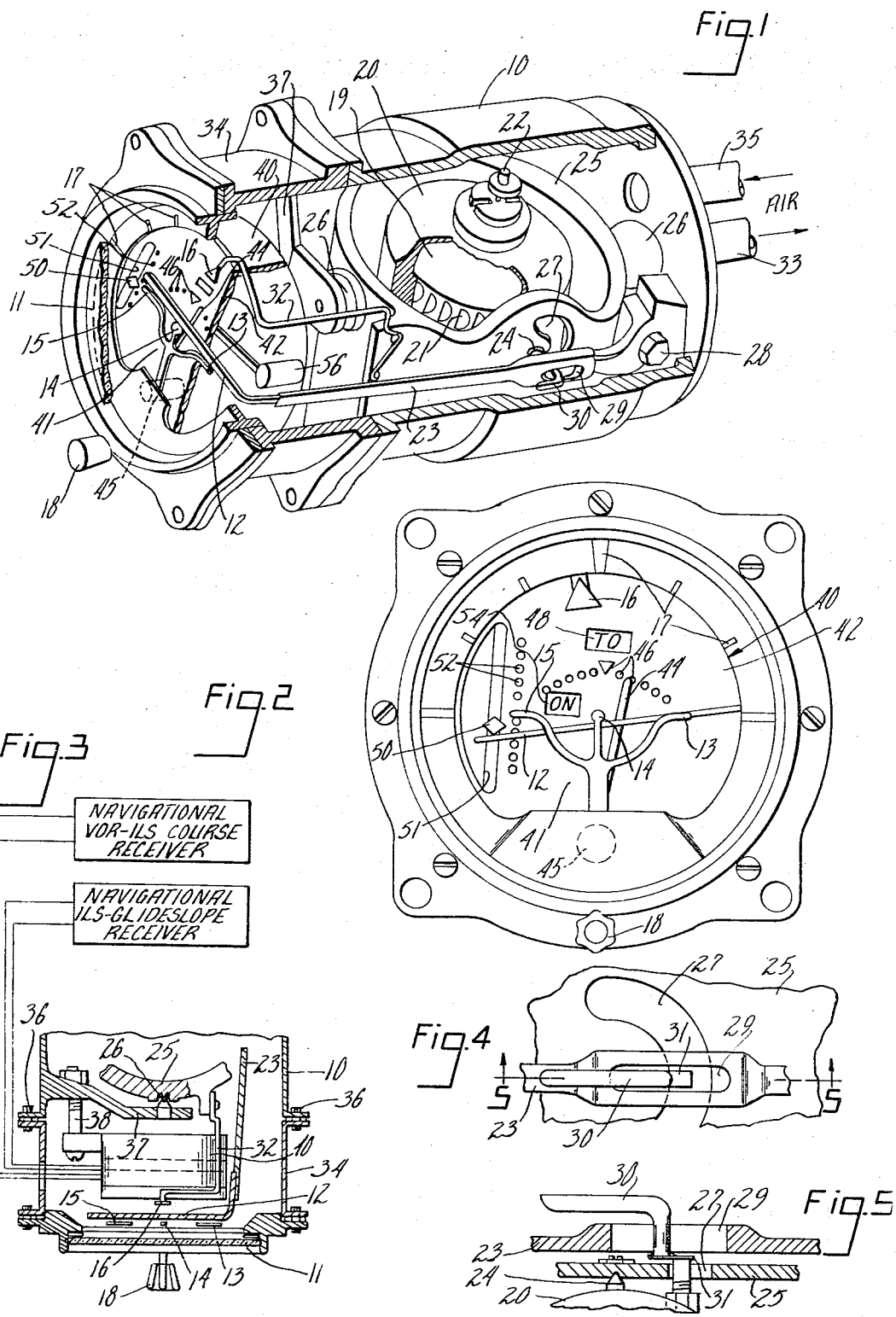

3,338,096
AIRCRAFT NAVIGATION INSTRUMENTS
Davies Harold Katz, 83 Lancaster St.,
Portland, Maine 04101
Filed Sept. 17, 1965, Ser. No. 488,134
9 Claims. (Cl. 73—178)

ABSTRACT OF THE DISCLOSURE

A self-contained aircraft instrument having integral radio navigation course and glide slope pointers for co-operation with an external navigational radio receiver providing an electrical course signal. The gyro horizon has aircraft roll and pitch indicating means and gyro sensing means including air turbine gyro driving means mounted within a supporting enclosure. An enclosed air flow shielding electrical radio navigation meter having a transparent front face is mounted within the enclosure between the gyro and the indicators.

---

This invention relates to aircraft navigation instruments and more particularly to a self-contained gyro horizon with one or more integral radio navigation course pointers for connection to external navigational radio equipment providing electrical course signals, especially useful as a precision approach horizon.

For flight under instrument conditions FAA regulations prescribe that an aircraft be equipped with gyroscopic instruments including a gyro horizon. The majority of aircraft, excluding certain airline, military, and sophisticated commercial aircraft, are equipped with surplus World War II air driven gyro instruments since such instruments, suitably rebuilt and certified, are still available in large volume at far lower cost than it is possible to manufacture new instruments.

In addition to gyro instruments, aircraft of all types are generally equipped with VOR navigational radio equipment, in which deviation from a pre-set ground course is indicated by displacement of a course pointer to the left or right of a null point. They may also be equipped with an ILS navigational radio equipment, which, in addition to ground course deviation, indicates ILS course and glide slope information by the displacement of a glide slope pointer above or below a null point.

In using his instruments to follow an approach course which is pre-set into his navigational radio equipment, the pilot, in addition to keeping course and glide slope pointers centered, must control his aircraft as to attitude and direction, the first indications of changes from the pre-set course at constant attitude appearing as roll and pitch changes on his gyro horizon. Thus the pilot must constantly scan back and forth among his instruments, and primarily between his radio navigation course meter and his gyro horizon, particularly during an approach to an airport runway using ILS when these two instruments provide practically all the visual information needed by the pilot.

Because of this necessity for constant scanning by the pilot, it long has been realized that the visual presentations of the instruments involved might advantageously be combined into a single instrument, and such has in fact been done as shown, for example, in Patents Nos. 2,943,482 and 3,019,532, assigned to Collins Radio Company, a well-known manufacturer of high quality radio equipment. However, typically, as shown in said patents, all such equipment heretofore known included not only a visual presentation instrument itself but also an external system including a remote gyro needed to operate it. These systems are highly complicated and expensive, costing thousands of dollars, far more than the few hundred dollars needed for the purchase of a surplus gyro horizon and a simple VOR-ILS course navigational radio receiver. Thus, as a practical matter, such a combined navigational presentation instrument simply has not been available to the vast majority of aircraft owners and pilots.

Accordingly, it is the major object of the present invention to produce an inexpensive self-contained gyro horizon with one or more integral radio navigation course pointers for connection to external navigational radio equipment.

This object has been accomplished primarily by utilizing a simple self-contained gyro horizon instrument, preferably of a conventional air driven World War II surplus type, and incorporating therein at least an electrically actuated radio navigation course pointer by the use of certain novel features as hereinafter described including air shielding means effective to prevent the air currents present within the gyro horizon enclosure from affecting the pointer indications.

It is a particular feature of the instrument of the invention that it may be readily manufactured by combining its two FAA licensed major components, suitably modified, without FAA relicensing, a substantial cost saving.

For the purpose of more fully explaining the above and other objects and features of the aircraft navigational instrument of the invention, reference is now made to the following detailed description of a preferred embodiment thereof, together with the accompanying drawings, wherein:

FIG. 1 is an isometric view, partly broken away and in section, of the instrument of the invention;

FIG. 2 is a front view of the instrument of FIG. 1 showing a typical aircraft attitude and course;

FIG. 3 is a sectional plan view of a portion of the instrument of FIG. 1;

FIG. 4 is a plan detail view of the instrument of FIG. 1 and

FIG. 5 is a view taken along line 5—5 of FIG. 4.

In the drawings, referring particularly to the cut-away isometric FIG. 1, is shown the complete self-contained aircraft navigational instrument of the invention including a gyro horizon with integral radio navigation course pointers for cooperation with an external navigational radio equipment of the VOR-ILS type providing electrical course signals. Such radio receivers being widely used and well understood by those skilled in the art, need not be further discussed except to note that such receivers commonly provide their electrical output signals to external indicators in the form of electrical meters having one or more pointers, a VOR-ILS course pointer and an ILS glide slope pointer with associated TO-FROM and ON-OFF indicators, respectively. Simpler and less expensive VOR radio equipment omits the glide slope function, so that its associated meter needs only a course pointer.

The self-contained gyro horizon instrument of FIG. 1, as preferably utilized in the instrument of the present invention, is of the World War II surplus air-driven type, although other types might be used as well.

In general, the instrument has a cylindrical supporting enclosure 10 having a front plate with a circular opening having a glass closure 11 therein. The front plate is conventionally mounted on an aircraft instrument panel with the enclosure extending behind it. The instrument has mounted behind the glass 11 a horizon bar 12 which moves in such a way that the position of the miniature airplane with its center indicia 14 and wings 13, 15 in relation to the horizon bar corresponds to the position of the aircraft in relation to the actual horizon. It also has a roll reference indicator 16 which moves to indicate the degree of roll by means of roll reference marks 17. The miniature airplane is supported from the lower front of the instrument and is approximately in the center of the front opening of the instrument while the roll reference marks are around the upper portion of the opening. Vertical adjustment for pitch is provided for the miniature airplane by a knob 18. In use, the miniature airplane moves with the actual aircraft around the horizon bar which is held level by the gyro. The bank of the aircraft is thus accurately reflected by the bank of the miniature airplane in relation to the horizon bar and by the roll reference indicator. The pitch of the airplane is indicated by the vertical position of the miniature airplane in relation to the horizontal bar. The attitude of the actual aircraft is thus presented visually to the pilot.

The basic mechanism of the instrument is a freely mounted gyroscope which always remains in a constant plane relative to the earth when the instrument is operating and so senses aircraft roll and pitch departures from that plane. This gyro is driven by air supplied by an engine driven suction pump or an outside venturi.

As may be seen more specifically in FIG. 1, gyro 19 with its air turbine 21 within housing 20 is mounted for rotation on a vertical shaft 22 which in turn is mounted within a horizontal gimbal ring 25 having mutually perpendicular bearing sets, inner set 24 supporting gyro housing 20 within said ring, and outer set 26 supporting the gimbal ring within the generally cylindrical supporting enclosure 10. The horizon bar 12 and the roll reference indicator 16 are supported by arms 23, 32, respectively, which extend back to the gimbal ring 25.

More specifically the horizon bar arm 23 is mounted on a pivot 28 at the rear of the horizontal gimbal ring 25 which allows the horizon bar to move up and down but allows it no lateral motion, so that it is held constantly horizontal since the gimbal ring on which it is mounted is held horizontal laterally by gyro 19. The up and down pitch movement of arm 23 is accomplished by the movement of an offset pin 30 mounted on gyro housing 20, said pin passing through a curved slot 27 in gimbal ring 25 and a straight slot 29 in horizon bar arm 23. As best shown in FIG. 5, the vertical travel of horizon bar arm 23 may be modified to compensate for any change in its length by utilizing an intermediate adjusting plate 31 inserted between the portions of pin 30 which contact slot 27 on one side and slot 29 on the other, it being understood that in modifying the horizon bar arm 23 of a conventional air driven gyro horizon to lengthen it according to the hereinafter described structure of the present invention, the pitch indication of the horizon bar 12 will be increased. If such not be desired, adjusting plate 31 can be inserted to decrease the vertical movement of the horizon bar to any extent desired.

The roll reference indicator arm 32 is more simply mounted by being fixed to the forward end of gimbal ring 25.

For driving the gyro 19, an air inlet 33 is provided generally centrally of the rear of the enclosure 10 for passage of high velocity air through the hollow gimbal ring 25 and its bearings through turbine 21 and thence to the interior of enclosure 10 creating high velocity air currents therein. An air outlet 35 is provided in the rear wall of the enclosure for connection to a suitable suction source such as a suction pump or venturi, so that air flow between said inlet and outlet at high velocity and passing through enclosure 10 functions to drive the gyro.

According to the present invention, at least a radio navigation course pointer and preferably as well a glide slope pointer, electrically operated by an external navigation receiver in the conventional manner, are uniquely combined with the air driven gyro horizon described above in such a way as to present a maximum of visual information to the pilot without impairing the function of either gyro horizon or electrically operated pointers in any way. In an air driven gyro horizon, this has been uniquely accomplished without affecting the essential high velocity air flow for operating the gyro horizon while shielding the delicate electrical pointers from such air flow by positioning of the air shielded pointers and the horizon relatively to one another for an optimum visual presentation to the pilot.

The preferred embodiment of the invention, as shown in the drawings, accomplishes the desired results by utilizing an enclosure extension 34 for extending the length of enclosure 10 at its front portion simply by bolting it thereto by suitable bolts 36 with the gyro and turbine with its gimbal system mounted at the rear end of the combined enclosure, the horizon bar and roll reference indicator with their reference marks at the front thereof, with the electrical course pointers with their reference marks in an intermediate position.

In the instrument of the present invention, the opening of the front plate has a horizon indicating bar 12 extending across it and a roll reference indicator 14 positioned normal to said horizon bar for movement around the upper half of said opening, both immediately behind the front glass. A plurality of fixed reference marks, also positioned immediately behind glass, are provided for the horizon indicating bar 12 and the roll reference indicator 16. These marks include an aircraft simulating reference element in the form of a miniature airplane mounted generally centrally across and extending up from the bottom of the opening, such including a central indicia 14 with laterally extending wings 13, 15, mounted in vertically adjustably fixed position and so adjustable by knob 18. As conventional, the aircraft reference element is positioned close to and in front of horizon bar 12. Roll reference marks 17 are also provided on plate 11 around the upper portion of the opening. These reference marks cooperate in the conventional manner with the horizon indicating bar and the roll reference indicator to indicate aircraft pitch and roll and hence aircraft attitude.

For mounting and shielding the electrically actuated course and glide slope pointers, an enclosed air flow shielding electrical radio navigation meter 40 having a transparent front face 41 is mounted within the supporting enclosure extension 34 on gimbal bracket 37 by bolts 38, the meter 40 being spaced inwardly from the enclosure wall providing room for the horizon bar and roll reference arms therebetween with the gyro and air turbine positioned rearwardly thereof and said horizon indicating bar, said roll reference indicator, the aircraft simulating reference element and the roll reference marks positioned forwardly thereof. The radio navigation meter 40 has a LEFT-RIGHT course pointer 44 with a free end mounted therewithin for swinging movement of said free end along a generally horizontally extending path about an axis 45 positioned generally centrally adjacent the bottom of said opening.

Generally horizontally extending course pointer reference marks 46 are provided on the dial face 42 of the meter 40, said marks having a null point in the form of a triangle adjacent the aircraft reference element central indicia 14 and radially positioned between said aircraft simulating reference element central indicia and the roll reference indicator 16 with its roll reference marks 17. A TO-FROM indicator 48 is also preferably provided radially positioned on dial face 42 between the course pointer reference marks 45 and the roll reference indicator 16. Conventional electrical actuating means 43 are provided for said course pointer 40, such means together with TO-FROM indicator 48 being connected to the external VOR-ILS navigational radio receivers.

With an external navigational radio receiver which provides an electrical glide slope signal, the radio navigation meter 40 also includes a glide slope pointer 50 having a free end mounted within said meter enclosure behind dial face 42 for swinging movement of said free end along a generally vertical extended path in a slot opening 51 adjacent a side of the dial 42. Generally vertically extending fixed glide slope reference marks 52 are provided along the slot, such marks having a null point in the form of a triangle adjacent an outer end of one of the wings of the aircraft reference, conventionally the left wing 15. Again, actuating means 56 and an ON-OFF indicator 54 are provided for the glide slope pointer 50 for connection to the external navigational radio receiver.

With the electrical meter 40 positioned immediately in front of the gyro housing 20 with its turbine and gimbal system and the horizon bar and roll reference indicator positioned in front of the electrical meter 40, the horizon bar and said roll reference indicator each have their connecting arms 23 and 32, respectively, extending around the outside of the radio navigation meter 40 but within the supporting enclosure for connection to the gyro means for movement with the gyro to indicate aircraft roll and pitch. For modification of an existing gyro according to the invention, a new roll reference indicator arm 32 is preferably provided in the form best shown in FIG. 1. The horizon bar arm 23 may readily be lengthened by cutting it and adding a suitable lengthening insert therein, with its operating pin 30 being modified as above set forth if such be desired.

In operation, the secret of the ability of the precision approach horizon instrument of the invention to make possible a precise ILS approach to an airport runway with a minimum of effort, even in extremely rough air, apparently is that it requires but the use of a single instrument from which the pilots attention need not be diverted. In such an approach, the pilot's first concern, of course, is maintaining a fixed attitude in pitch and keeping his wings level, with the collateral benefit of knowing that if he keeps his wings level the aircraft will go straight. Up to this point, using a conventional gyro horizon, with everything satisfactory as to attitude, it is then customary for the pilot to divert his attention from the gyro horizon and make scanning circuit of his other instruments, to see how he is doing navigationally, to check his altitude, his heading as related to what it needs to be navigationally, his position above or below the glide slope, his rate of descent, and so on.

Frequently, by the time the pilot gets back to the gyro horizon, he is in a bank and finds that his aircraft has turned to a considerable degree even in the short interval of his scanning circuit. So bracketing the ILS approach course is never quite finished, at least when it is rough.

But with the instrument of the invention, even while the pilot is busy with the controls in keeping the miniature airplane of the gyro horizon in a certain position in relation to the horizon bar, if the course or glide slope pointers start veering from their null point, he cannot help being aware of it, even though he does not really look at them, so he banks for a second and then levels up to correct his approach. The pilot soon feels that he is actually "flying" the course and glide slope pointers, since with the instrument of the invention, he never gets very far off the course he is trying to fly, since his attitude and navigational control are both visually presented right in front of him by a single instrument. A typical such presentation is shown in FIG. 2 wherein the displacement of the course pointer to the right and the glide slope pointer downward indicates that the desired course is to the right and above the actual aircraft, while the position of the miniature aircraft indicates that the actual aircraft is in a climbing right turn as is necessary to return to the desired course.

Thus, the instrument of the invention for the first time makes available at a reasonable cost a self-contained integrated instrument incorporating a gyro horizon with radio navigational course pointers for simultaneous visual presentation to the pilot of aircraft attitude and radio navigation information. Various modifications of the invention, including the addition of a suitable computer to provide course director operation of the course pointer, within the spirit of the invention and the scope of the appended claims will be apparent to those skilled in the art.

I claim:
1. A self-contained instrument having an integral gyro horizon with an integral radio navigation course pointer for cooperation with an external navigational ratio receiver providing an electrical course signal, comprising aircraft roll and pitch sensing gyro means including driving means integral with said gyro means for driving said gyro means a supporting enclosure for said gyro means having a front opening at one end thereof a horizon indicating bar extending across said opening and connected to said gyro means for movement in response thereto an aircraft reference element mounted generally centrically within said opening, said reference element cooperating with said horizon indicating bar to indicate aircraft pitch and roll a course pointer having a free end mounted for movement of said free end along a generally horizontally extending arcuate path generally horizontally extending fixed course pointer reference marks having a generally central null point and electrical actuating means within said enclosure for said course pointer for connection to said external navigational radio and air shielding means positioned within said enclosure between said gyro means with its said integral driving means and said course pointer effective to prevent air currents within said enclosure due to said gyro means from affecting said pointer.

2. A self-contained instrument as claimed in claim 1, wherein said external navigational radio receiver additionally provides an electrical glide slope signal and further comprising a glide slope pointer having a free end mounted for movement of said free end along a generally vertical extended path adjacent a side of said opening generally vertically extending fixed glide slope reference marks having a null point adjacent an outer end of said aircraft reference element and electrical actuating means within said enclosure for said glide slope pointer for connection to said navigational radio receiver.

3. A self-contained instrument as claimed in claim 1, wherein said aircraft reference element has a central indicia with laterally extending wings mounted in limited vertically adjustably fixed position and said course pointer reference marks have a null point adjacent the aircraft reference element central indicia.

4. A self-contained instrument as claimed in claim 1, further including
   a roll reference indicator positioned normal to said horizon bar for movement around the upper half of said opening and
   a plurality of roll reference marks around the upper portion of said opening and wherein
   said fixed course pointer reference marks are positioned between said aircraft reference element and said roll reference indicator with its roll reference marks.

5. A self-contained instrument having an integral gyro horizon with an integral radio navigation course pointer for cooperation with an external navigational radio receiver providing an electrical course signal, comprising
   aircraft roll and pitch sensing gyro means including air turbine means integral with said gyro means for driving said gyro means
   a supporting enclosure for said gyro and turbine means having a front opening at one end thereof
   a horizon indicating bar extending across said opening and connected to said gyro means for movement in response thereto
   an aircraft reference element mounted generally centrally within said opening, said reference element cooperating with said horizon indicating bar to indicate aircraft pitch and roll
   a course pointer having a free end mounted for movement of said free end along a generally horizontally extending arcuate path
   generally horizontally extending fixed course pointer reference marks having a generally central null point
   electrical actuating means within said enclosure for said course pointer for connection to said external navigational radio and
   air shielding means positioned within said enclosure between said gyro means with its said integral air turbine means and said course pointer effective to prevent air currents within said enclosure due to said gyro means from affecting said pointer.

6. A self-contained instrument as claimed in claim 5, wherein
   said course pointer is positioned behind said horizon bar and in front of said gyro means and
   said air shielding means comprises an air shielding enclosure having a transparent front face enclosing said pointer
   said horizon bar having a connecting member extending around said air shielding enclosure within said supporting enclosure.

7. A self-contained instrument having an integral gyro horizon with an integral radio navigation course pointer for cooperation with an external navigational radio receiver providing an electrical course signal, comprising
   aircraft roll and pitch sensing gyro means including air turbine means integral with said gyro means for driving said gyro means
   a supporting enclosure for said gyro and turbine means having a front opening at one end thereof
   a horizon indicating bar extending across said opening and connected to said gyro means for movement in response thereto
   an aircraft reference element mounted generally across said opening and cooperating with said horizon indicating bar to indicate aircraft pitch and roll
   an enclosed air flow shielding electrical radio navigation meter having a transparent front face, said meter being mounted within said supporting enclosure with said sensing gyro and air turbine means positioned rearwardly thereof and with said horizon indicating bar positioned forwardly thereof
   said horizon bar having a connecting member extending around said radio navigation meter within said supporting enclosure
   said radio navigation meter having a course pointer with a free end mounted therewithin for movement of said free end along a generally horizontally extending path
   generally horizontally extending fixed course pointer reference marks having a generally central null point and
   electrical actuating means within said enclosure for said course pointer for connection to said external navigational radio receiver.

8. A self-contained instrument having an integral gyro horizon with an integral radio navigation course pointer for cooperation with an external navigational radio receiver providing an electrical course signal, comprising
   aircraft roll and pitch sensing gyro means including air turbine means integral with said gyro means for driving said gyro means
   a supporting enclosure for said gyro and turbine means having a front opening at one end thereof
   a horizon indicating bar extending across said opening and a roll reference indicator positioned normal to said horizon bar for movement around the upper half of said opening, said horizon indicating bar and said roll reference indicator being connected to said gyro means for movement in response thereto
   a plurality of fixed reference marks for said horizon indicating bar and said roll reference indicator including an aircraft reference element mounted generally centrally across said opening and having a central indicia with laterally extending wings mounted in vertically adjustably fixed position and roll reference marks around the upper portion of the opening, said reference marks cooperating with said horizon indicating bar and said roll reference indicator to indicate aircraft pitch and roll
   an enclosed air flow shielding electrical radio navigation meter having a transparent front face, said meter being mounted within said supporting enclosure with said sensing gyro and air turbine means positioned rearwardly thereof and said horizon indicating bar and said aircraft reference element positioned forwardly thereof
   said horizon bar and said roll reference indicator each having a connecting member extending around said radio navigation meter within said enclosure
   said radio navigation meter having a course pointer having a free end mounted therewithin for movement of said free end along a generally horizontally extending path about an axis positioned generally centrally adjacent the bottom of said opening
   generally horizontally extending course pointer reference marks having a null point adjacent the aircraft reference element central indicia and radially positioned between said aircraft simulating reference element and said roll reference indicator with its roll reference marks and
   electrical actuating means within said enclosure for said course pointer for connection to said external navigational radio receiver.

9. A self-contained instrument as claimed in claim 8 wherein
   said external navigational radio additionally provides an electrical glide slope signal and
   wherein said radio navigation meter includes
      a glide slope pointer having a free end mounted within said meter enclosure for movement of said free end along a generally vertical extended path adjacent a side of said opening
      generally vertically extending fixed glide slope reference marks having a null point adjacent an outer end of one of said wings and electrical actuating means within said enclosure for said glide slope pointer for connection to said external navigational radio receiver.

References Cited

UNITED STATES PATENTS

| | | | |
|---|---|---|---|
| 2,367,412 | 4/1949 | Wathen | 73—178 |
| 2,485,552 | 10/1949 | Aumuller | 33—204 |
| 2,732,550 | 1/1956 | Reedy | 73—178 |
| 2,737,640 | 3/1956 | Barnagy | 73—178 |
| 2,863,142 | 12/1958 | Meredith et al. | 73—178 |
| 2,941,400 | 6/1960 | Nesbitt | 73—178 |
| 2,943,482 | 7/1960 | Fritze et al. | 73—178 |
| 3,019,532 | 2/1962 | Haerther et al. | 33—204 |
| 3,181,249 | 4/1965 | Cuffing | 33—204 |
| 3,197,881 | 8/1965 | Burger | 33—204 |

DAVID SCHONBERG, *Primary Examiner.*

LOUIS R. PRINCE, *Examiner.*

N. B. SIEGEL, *Assistant Examiner.*